United States Patent
Singh et al.

(10) Patent No.: US 10,577,822 B1
(45) Date of Patent: Mar. 3, 2020

(54) SECURE STRONGBOX WITH ILLUMINATION

(71) Applicants: Edward G. Singh, La Mirasa, CA (US); Steve R. Castro, La Habra, CA (US)

(72) Inventors: Edward G. Singh, La Mirasa, CA (US); Steve R. Castro, La Habra, CA (US)

( * ) Notice: Subject to any disclaimer, the term of this patent is extended or adjusted under 35 U.S.C. 154(b) by 0 days.

(21) Appl. No.: 16/183,769

(22) Filed: Nov. 8, 2018

(51) Int. Cl.
| | |
|---|---|
| *E04H 15/10* | (2006.01) |
| *F21V 23/04* | (2006.01) |
| *F21V 33/00* | (2006.01) |
| *E05G 1/00* | (2006.01) |
| *E05G 1/04* | (2006.01) |
| *E05G 1/10* | (2006.01) |
| *E05G 1/026* | (2006.01) |

(52) U.S. Cl.
CPC ............. *E04H 15/10* (2013.01); *E05G 1/005* (2013.01); *E05G 1/026* (2013.01); *E05G 1/04* (2013.01); *E05G 1/10* (2013.01); *F21V 23/04* (2013.01); *F21V 23/0435* (2013.01); *F21V 33/006* (2013.01); *E05Y 2400/44* (2013.01); *E05Y 2400/612* (2013.01); *E05Y 2400/628* (2013.01); *E05Y 2800/106* (2013.01)

(58) Field of Classification Search
CPC ......... E04H 15/10; E05G 1/005; E05G 1/026; E05G 1/04; E05G 1/10; F21V 23/04; F21V 23/0435; F21V 33/006
USPC ......................................................... 362/362
See application file for complete search history.

(56) References Cited

U.S. PATENT DOCUMENTS

| | | | | | |
|---|---|---|---|---|---|
| 3,321,979 | A | * | 5/1967 | Blazek ................... | G01C 19/20 74/5.14 |
| 3,780,966 | A | * | 12/1973 | Newcomb, Jr. .......... | B64G 1/36 244/171 |
| 4,054,789 | A | * | 10/1977 | Romanelli ............... | B60Q 1/52 362/542 |
| 4,202,030 | A | * | 5/1980 | Kimura .................... | B60Q 3/88 362/144 |
| 4,779,171 | A | * | 10/1988 | Ferguson ................ | E05B 17/10 362/100 |
| 5,010,454 | A | * | 4/1991 | Hopper .................... | B60Q 7/00 362/183 |
| 5,032,957 | A | * | 7/1991 | Canfield ................. | A47B 81/00 362/133 |
| 5,602,526 | A | * | 2/1997 | Read ........................ | B60Q 3/30 116/28 R |
| 5,660,425 | A | * | 8/1997 | Weber ...................... | E04H 15/06 135/88.01 |
| 7,097,330 | B1 | * | 8/2006 | Straus .................... | F21V 17/107 362/147 |

(Continued)

*Primary Examiner* — Bryon T Gyllstrom
(74) *Attorney, Agent, or Firm* — Gene Scott; Patent Law & Venture Group

(57) ABSTRACT

A case is mounted to a structure of a canopy or tent. The canopy functions as a campsite shelter. The case provides a lamp and a portal providing access to an interior space within the case where valuables may be safely stored. The apparatus may be secured to ceiling trusses of the canopy. An electrical circuit is engaged within the case and may include a battery providing power to the lamp. A remote control circuit functions to control the lamp. The battery may be charged by a solar cell. An audible alarm may be controlled by a motion sensor or by a case attitude detector remotely controlled.

2 Claims, 3 Drawing Sheets

(56) References Cited

U.S. PATENT DOCUMENTS

| | | | |
|---|---|---|---|
| 7,703,466 B1* | 4/2010 | Smith | E04H 15/10 135/135 |
| 8,714,174 B1* | 5/2014 | DeSousa | E04H 15/58 135/117 |
| 2004/0032729 A1* | 2/2004 | Choi | A47J 37/0786 362/92 |
| 2004/0125597 A1* | 7/2004 | Einav | B25H 3/02 362/154 |
| 2006/0072328 A1* | 4/2006 | Chan | F21V 21/22 362/382 |
| 2009/0185359 A1* | 7/2009 | Martinez | F21L 4/08 362/20 |
| 2009/0196028 A1* | 8/2009 | Chao | G09F 13/04 362/183 |
| 2012/0201041 A1* | 8/2012 | Gergets | B60Q 1/2611 362/493 |
| 2014/0268825 A1* | 9/2014 | Lay | F21V 21/03 362/371 |

* cited by examiner

US 10,577,822 B1

SECURE STRONGBOX WITH ILLUMINATION

FIELD OF THE DISCLOSURE

The described invention relates to safes and secure storage boxes, and also relates to lamps for the illumination of spaces. The invention may be advantageously used inside camping tents, under shading canopies, and within many structures temporary or permanent.

BACKGROUND

Tents, canopies, and similar shelters are often used at campsites when camping, climbing, hiking, beach going, and similar outdoor recreational activities. It is desirable to have illumination within such shelters. It is also desirable to be able to safely secure personal items such as wallets, watches, and cell phones when away from the campsite as it is necessary to avoid getting such items wet, damaged, lost, or stolen. The prior art teaches several apparatus that have similar purposes, such as U.S. Pat. No. 7,980,185 to Walter E. Teague, Jr. which teaches a locking apparatus that may be fixed to an outdoor ground surface by the use of an attached auger, and U.S. Pat. No. 3,496,349 to Wilbur J. Townsend which teaches a portable lamp with a built-in storage compartment.

BRIEF DESCRIPTION OF THE INVENTION

An electrical circuit is mounted within an enclosure box or case which is securely fastened to the interior of a tent, canopy, cabin or other structure. The enclosure is formed to resemble a lighting fixture and the circuit may be used to power a lamp mounted in the enclosure. To provide for extended use, the circuit may be solar powered. The enclosure provides for concealed storage for valuables and the unwary will normally assume that the enclosure is a lamp only. The circuit may also provide for detecting a person who approaches and will set-off an alarm unless the person has a means for silencing the alarm. In an alternate approach, the alarm sound may be activated when an unauthorized person attempts to handle the enclosure, as for instance in an attempt to open it or remove it whereby attitude sensors trigger the alarm. When an authorized person approaches, a hand-held remote control is used to disarm the circuit. There are many mechanical attachment elements that may be used to secure the enclosure to the structure. For instance, straps, bands or chains may be fastened to the enclosure and also engaged with the struts or other structural elements of a tent or canopy for example. In this case, the enclosure cannot be removed without unlocking the fasteners. The invention provides the benefit of securing valuables within a temporary structure such as a tent or canopy in a manner that may prevent discovery and removal. The invention also provides the benefit of illumination within the temporary structure.

BRIEF DESCRIPTION OF THE DRAWINGS

Embodiments of the described apparatus are illustrated only as examples in the drawing figures accompanying this written description. Alpha-numerical call-outs are used to identify elements of the invention, wherein the same call-out refers to the same element as it may appear in the several drawing figures described as follows.

DETAILED DESCRIPTION OF THE INVENTION

Figure 1:
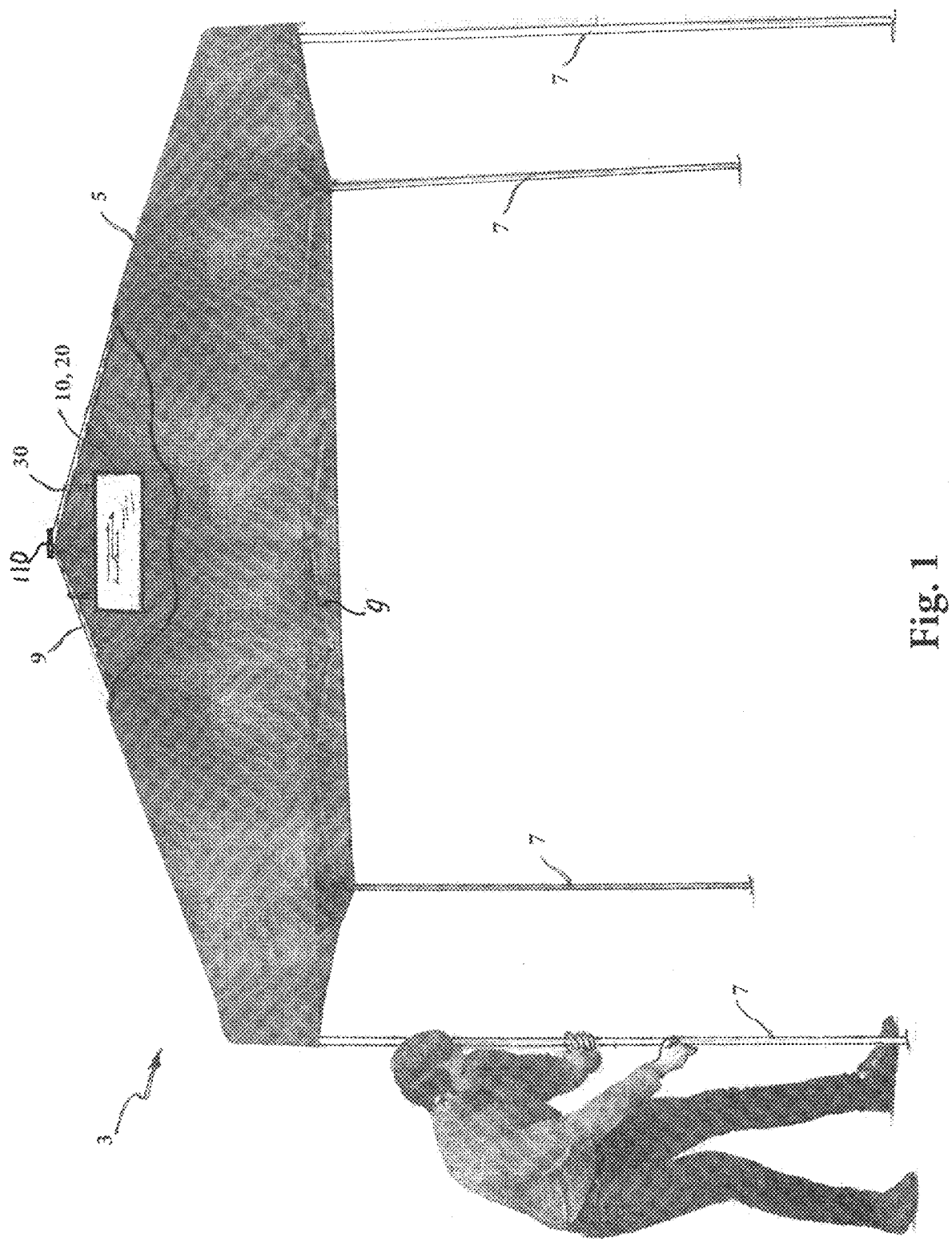
FIG. 1 is a perspective view of a campsite canopy assembly with a front portion of a canopy cover cut-away to reveal a box-shaped enclosure secured to structural members of the canopy assembly.

In this description and the attached drawings, numerals are used to label elements of the invention and said numerals are shown in the associated drawing figures. As shown in FIG. 1, a canopy 3 may have a canopy cover 5 supported by legs 7 and an interior structure 9 such as struts and trusses as is well known in the field of the invention. The term "canopy" is used herein generically to represent any type of enclosure such as a tent, etc. A case 10 such as a strongbox may incorporate an illuminator 20 which may be any type of lamp. An exterior fixture 30 such as a metal bar, a cable, a chain, etc., may be hinged or otherwise attached to case 10 for securing it to structure 9 to secure case 10 in place under canopy 3 as a means for preventing theft as will be described.

Figure 2:
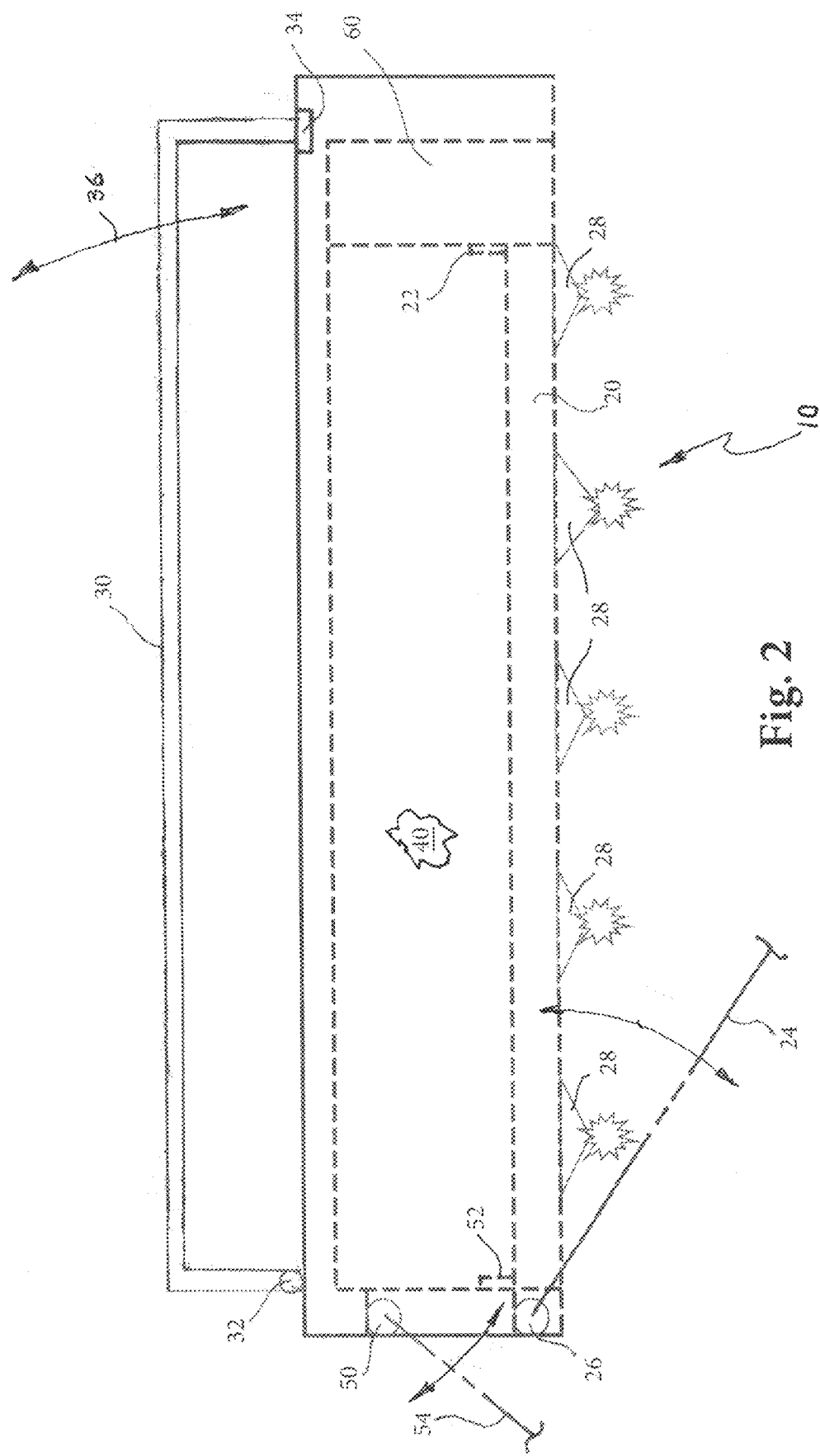
FIG. 2 is a schematic diagram showing the enclosure in a front elevation view and clearly showing access and fastening elements.

Referring now to FIG. 2, it is shown that case 10 is preferably box-shaped as illustrated but may take any other shape, and may be constructed of rigid materials such as metal. Case 10 may provide an interior space 40, which may be secured within surrounding walls 12, 14, and 16 as illustrated. Space 40 may be used for securing valuables such as a watch, wallet, cell phone, eyeglasses, and credit cards. A means for entry 50 into space 40 may be engaged with case 10 as for example a hinged side door (shown) a portion of wall 12 which may rotate outwardly as depicted by phantom line 54. Means for entry 50 may also be a sliding door rather than a hinged door or may comprise any other type of door or portal. As shown, means for entry 50 may have a locking mechanism 52 which may be a key lock or a remote-controlled lock as will be described below, or any other type of lock. Therefore when valuables are placed within space 40 they may be secured.

Referring again to FIG. 2, it is shown that illuminator 20 may comprise a hinged tray with elements of illumination 28 mounted therein or thereon as shown. Elements of illumination 28 may be of any lighting type including incandescent, arc, ultraviolet, fluorescent, gas-discharge, infrared or solid state (LED), and may comprise a single illuminating element or multiple elements as is shown in the figure. Illuminator 20 may be hinged at element 26 shown as a hinge pin. As a hinged tray, illuminator 20 may rotate downwardly as depicted by phantom line 24, thereby providing full access into space 40. As a hinged tray, illuminator 20 may be placed into a closed position as shown and locked in place at locking mechanism 22 which may be a key lock or a remote-controlled lock as will be described below, or any other type of lock.

Referring still to FIG. 2 it is shown that fixture 30 may be a hinged bar (shown), or other common attachment means such as chains, or cables (not shown). Fixture 30 may rotate upwardly following arrow 36 about hinge pin 32 into an open attitude for engagement with structure elements 9, and thereafter may be locked in place at locking mechanism 34. Locking mechanisms (locks) 22, 34, and 52 may be identical locking devices or may be different from each other. Such locks may be of any type such as key locks, padlocks, combination locks, Chinese locks, voice operated locks, iris scanning locks, fingerprint recognition locks, facial recognition locks, and remote control locks, as are known in the art, or any other type of securing means now known, or developed in the future. Rather than being secured by locks, hidden or nonobvious pressure panels, buttons, or surfaces may be employed (not shown) for producing the required access actions with respect to elements 20, 30 and 50. Such actuation devices are well known in the art. Electrical circuit 60 may be mounted within enclosure 10.

Figure 3:
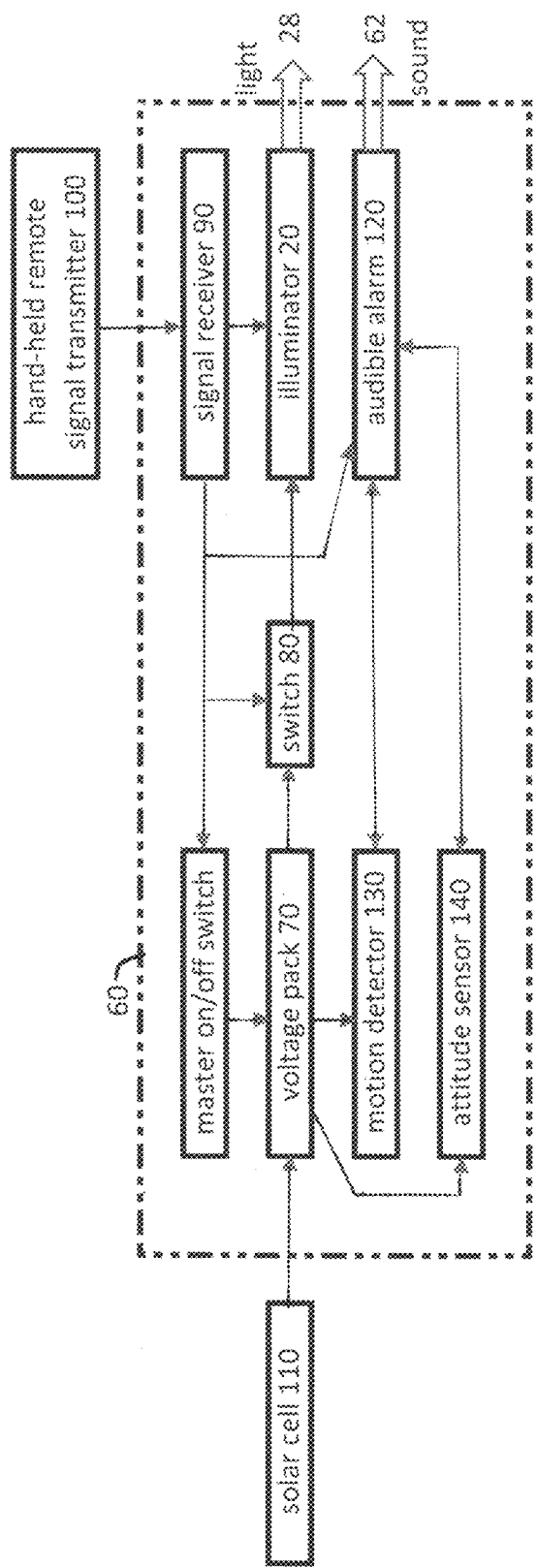
FIG. 3 is a block diagram of an electrical circuit thereof.

Referring now to FIG. 3 it is shown that electric circuit 60 may include several electric components notably a voltage pack or battery 70, such as one or more common alkaline cells which may be interconnected to produce electric power for operating illuminator 20, and an electric switch 80 such as a solid state relay contactor of the type provided by Crydom, Inc., Sensata Technologies or other well-known electrical parts and circuits manufactures. Electrical switch 80 may be adapted for controlling illuminator 20 by simple electrical interconnections, that is, for turning illuminator 20 on and off. Electrical circuit 60 may further include an electrical signal receiver or transceiver 90 such as those employing Bluetooth wireless technology using short-wavelength UHF radio waves in the ISM band from 2.400 to 2.485 GHz, and a hand held electrical signal transmitter 100 such as a Bluetooth wireless keyboard as is well known in the art. Electrical signal receiver 90 may be adapted for controlling electrical switch 80 through standard and well-known circuit interconnects. In an embodiment of electrical circuit 60, a solar cell 110 may be used to charge voltage pack or battery 70 in order to anable extended operation.

In an embodiment, electrical circuit 60 may include an audible alarm device 120 such as the SC628 Mallory Sonalert by Sager Electronics, and a motion detector 130 such as the First Alert sfa600 detector provided commercially by Zoro Manufacturing.

In a further embodiment, electrical circuit 60 may further include an attitude sensor 140 such as the MPU-9150 generally available through distributors such as Amazon.com. This circuit, once set to an "on" state produces an alarm current when its attitude or position changes by more than a set number of degrees, or changes continuously over a set time period. Said electrical current may be used to drive audible alarm 120.

Electrical circuit 60 in the above embodiments is easily constructed by any experienced circuit technician. The electrical circuit elements described and shown in FIG. 3 are only examples of components that may be used. It will be realized by those of skill that many other circuit elements may be used or interchanged in producing operational circuit 60.

Referring again to FIG. 3, it is shown that voltage pack or battery 70 may drive illuminator 20 through switch 80 thereby producing light output as shown in the figure by large arrow 28. Motion detector 130 may also receive power from voltage pack or battery 70 and may drive audible alarm 120 to produce a warning sound as represented by large arrow 62 when motion is sensed in the vicinity of enclosure 60. If used together with motion detector 130, or by itself, attitude sensor 140 also may receive power from voltage pack or battery 70, as shown, and may also be connected to audible alarm 120 to produce said warning sound represented by arrow 62 when the physical position of enclosure 60 is changed as for instance by an unauthorized person attempting to remove it from its securement to canopy structure 9. As shown in FIG. 1, solar cell 110 may be placed for receiving sunlight, as for instance at the top of canopy 3 and current generated by cell 110 may be connected to voltage pack or battery 70 in order to provide a charging current. Hand-held remote signal transmitter 100 may direct control signals to signal receiver or transceiver 90 within case 60. Such control signals may cycle switch 80 for controlling illuminator 20. Such signals may also be useful in controlling the master on/off switch in order to shut down or start up all circuit functions. Such signals, as shown by arrows in FIG. 3 are also useful for setting and adjusting lighting levels at illuminator 20 and decimal levels at audible alarm 120. Other functions that may be set and controlled by signal transmitter 100 may be the sensitivity of motion detector 130, and attitude sensor 140. A potentially important function of control by signal transmitter 100 is the operation of locks 22, 34, and 52 as shown in FIG. 2. Miniature remotely controlled locking devices are very well known in the prior art and are ubiquitous in commercial use as for instance those available through manufacturers such as KKMOON® and UHPPOTE® which provide such hardware with installation and use instructions. The foregoing description represents embodiments of the claimed invention but are not exhaustive of the many alternate embodiments that those of skill may conceive of without diverging from the broad meaning of the claims.

What is claimed is:

1. An apparatus for hiding and securing valuables, the apparatus comprising:
   a canopy 3 including a rigid interior structure 9 of struts and trusses supported by legs 7 and a canopy cover 5 of flexible sheet material over said interior structure 9, said canopy 3 further comprising a case 10;
   said case 10 constructed of rigid material formed as a rectangular side panel 12, closed by a top panel 14 and an opposing bottom panel 16, said bottom panel 16 incorporating an illuminator 20, wherein said panels fully enclose an interior space 40 within case 10, said space 40 suitable for storing said valuables;
   said case 10 having a pivotally joined exterior fixture 30 hinged to said top panel 14 and engaging said interior structure 9 thereby securing said case 10 to said canopy 3;
   said bottom panel 16 with illuminator 20 rotatable between an upwardly rotated closed position, and a downward rotated open position 24 providing access to said interior space 40;
   said case 10 providing therein an electrical circuit 60 including electrical components:
   i) a battery 70 interconnected through an electric switch 80 for on/off functions of illuminator 20 and further interconnected with an attitude sensor 140 and a motion detector 130 interconnected with an audible alarm 120;
   ii) a signal receiver 90 interconnected for controlling electrical switch 80 and enabling status changes of said audible alarm 120 and said attitude sensor 140; and separate from case 10,
   iii) a solar cell 110 fixed to said canopy cover 30 and interconnected for charging said battery 70; and
   iv) a hand-held remote signal transmitter 100 enabled for sending wireless operating and control signals to said signal receiver 90.

2. The apparatus of claim 1 wherein said hand-held remote signal transmitter 100 and said signal receiver 90 are adapted to mutually communicate using short-wavelength UHF radio waves in the ISM band from 2.400 to 2.485 GHz.

\* \* \* \* \*